(12) United States Patent
Hsiung

(10) Patent No.: US 8,120,267 B2
(45) Date of Patent: Feb. 21, 2012

(54) LIGHT EMITTING DIODE DRIVING CIRCUIT

(75) Inventor: Ta Sung Hsiung, Taoyuan (TW)

(73) Assignee: Getac Technology Corporation, Hsinchu (TW)

( * ) Notice: Subject to any disclaimer, the term of this patent is extended or adjusted under 35 U.S.C. 154(b) by 253 days.

(21) Appl. No.: 12/718,922

(22) Filed: Mar. 5, 2010

(65) Prior Publication Data

US 2011/0121743 A1    May 26, 2011

(30) Foreign Application Priority Data

Nov. 21, 2009  (CN) .......................... 2009 1 0310188

(51) Int. Cl.
*H05B 37/00* (2006.01)

(52) U.S. Cl. ................. 315/241 R; 315/169.1; 315/238; 315/294; 315/297; 323/271; 323/282; 323/351; 327/108; 327/109; 372/38.02; 345/204; 345/82

(58) Field of Classification Search ............... 315/169.1, 315/169.3, 185 R, 227 R, 238, 240, 241 R, 315/275, 283, 224, 287, 291, 294, 297, 312; 323/222, 223, 271, 282, 277, 351; 372/38.02, 372/38.07, 38.04; 327/104, 108–111; 345/46, 82, 102, 204, 207, 211, 212

See application file for complete search history.

(56) References Cited

U.S. PATENT DOCUMENTS

| | | | |
|---|---|---|---|
| 6,724,376 B2 * | 4/2004 | Sakura et al. ................. | 345/204 |
| 7,615,974 B1 * | 11/2009 | Xu ................................ | 323/271 |
| 2010/0201283 A1 * | 8/2010 | Kawata et al. ............... | 315/287 |
| 2011/0068700 A1 * | 3/2011 | Fan .............................. | 315/185 R |

* cited by examiner

*Primary Examiner* — Haiss Philogene

(57) ABSTRACT

A LED driving circuit includes a bridge rectifier, a high-bias-voltage diode, a balancing capacitor, a driving chip, and a switch. The bridge rectifier receives external AC power and outputs a full-wave or half-wave AC power. One terminal of the high-bias-voltage diode and one terminal of the balancing capacitor are electrically coupled to a balancing node. The other terminals of the high-bias-voltage diode and the balancing capacitor are electrically coupled to the bridge rectifier and grounded respectively. The driving chip receives operating power from the balancing node, and outputs driving signals to operate the switch, so as to drive an LED. Through the arrangement of the forward bias voltage direction of the high-bias-voltage diode, the balancing capacitor is only discharged to the driving chip. Therefore, the capacitance value and the volume of the balancing capacitor, the space occupied by the driving circuit, and the cost of the driving circuit are reduced.

8 Claims, 7 Drawing Sheets

LIGHT EMITTING DIODE DRIVING CIRCUIT

BACKGROUND OF THE INVENTION

1. Technical Field

The present invention relates to a light emitting diode (LED) driving circuit, and more particularly to an LED driving circuit capable of reducing a capacitance value requirement for a capacitor in the LED driving circuit and a cost of the LED driving circuit.

2. Related Art

FIG. 1 is a block diagram of an LED driving circuit in the prior art. The LED driving circuit includes an AC power source 1, a rectifying device 2, a driving chip 3, a switch 4, and a load circuit 5. An implement of the rectifying device 2 is a bridge rectifier for receiving external AC power from the AC power source 1, converting the external AC power into a half-wave or full-wave driving AC power, and outputting through a rectifying output terminal 2a.

The driving chip 3 at least includes a receive pin 3a, a transmit pin 3b, a ground pin 3c, and a feedback pin 3d. The receive pin 3a is electrically coupled to the rectifying output terminal 2a and electrically coupled to one terminal of the load circuit 5. The transmit pin 3b is electrically coupled to the switch 4 and outputs a driving signal to set the switch 4 to on or to off. The ground pin 3c is indirectly or directly electrically grounded to obtain a zero potential reference. The feedback pin 3d is used for obtaining a potential to monitor the operation of the load circuit 5. The switch 4 has a first terminal point 4a and a second terminal point 4b. The first terminal point 4a is electrically grounded through a voltage dropping resistor 6. The feedback pin 3d of the driving chip 3 is electrically coupled to the first terminal point 4a to detect a potential of the first terminal point 4a, so as to determine whether the switch 4 is set to on or set to off.

The driving signal provided by the driving chip 3 is a pulse width modulation (PWM) signal for setting the switch 4 to on, so that the load circuit 5 obtains electrical power from the rectifying output terminal 2a to drive an LED 5a. Meanwhile, a magnitude of an average current received by the LED 5a may be changed by adjusting a pulse width and a pulse frequency, so as to change a brightness of the LED 5a.

The potential of the transmit pin 3b of the driving chip 3 is required to be maintained above a threshold potential, so as to keep the driving chip 3 to work normally. When the rectifying device 2 is a bridge rectifier outputting a half-wave or full-wave driving AC power, a rectified waveform period thereof is a half-wave period or full-wave period. In the rectified waveform period, the potential rises from zero to a peak value and then drops from the peak value to zero. Since the rectified waveform period includes a time period in which the potential of the output of the bridge rectifier is higher than the threshold potential and a time period in which the potential the output of the bridge rectifier is lower than the threshold potential, the potential of the transmit pin 3b cannot be continuously maintained above the threshold potential. Therefore, for the rectifying device 2 such as a bridge rectifier outputting a full-wave or half-wave driving AC power, the LED driving circuit has to be modified.

FIG. 2 is a block diagram of a modified LED driving circuit.

The modified LED driving circuit further includes at least one balancing capacitor 7' connected a rectifying output terminal 2a' of a rectifying device 2' to a ground wire. A balancing capacitor 6' is a high-pressured electric capacity having high capacitance value.

When an output potential of the rectifying device 2' is higher than a threshold potential, a current output from the rectifying output terminal 2a' drives the driving chip 3', charges the balancing capacitor 6', and drives an LED 5a' through a load circuit 5' to emit light at the same time.

When the output potential of the rectifying device 2' is lower than the threshold potential or the output potential is zero, the balancing capacitor 6' is discharged to maintain a potential of a transmit pin 3b' of the driving chip 3' above the threshold potential so as to maintain the operation of the driving chip 3'.

When the balancing capacitor 6' is discharged, a current output by the balancing capacitor 6' is transmitted to the load circuit and consumed thereby. In order to avoid rapid drop of a voltage difference between two terminals of the balancing capacitor 6' and prevent the potential of the transmit pin 3b' of the driving chip 3' from being lower than the threshold potential, the balancing capacitor 6' must have an extremely high capacitance value, or even multiple balancing capacitors 6' are required to be connected in parallel at the same time.

The balancing capacitor 6' having a high capacitance value incurs an extra manufacturing cost. Meanwhile, a capacitor having a high capacitance value also has a large volume and occupies extra space, so that a volume of an LED illumination device cannot be effectively reduced.

SUMMARY

In view of the above, the LED driving circuit in the prior art requires a capacitor having a high capacitance value to maintain a normal operation of the driving chip. Therefore, the present invention is directed to an LED driving circuit capable of lowering the required capacitance value of the capacitor.

The present invention provides a light emitting diode (LED) driving circuit for receiving external AC power from an AC power source, converting the external AC power, and providing a full-wave or half-wave driving AC power to an LED. The LED driving circuit includes a bridge rectifier, a high-bias-voltage diode, a balancing capacitor, a driving chip, and a switch. The bridge rectifier receives the external AC power and outputs the full-wave or half-wave driving AC power. The bridge rectifier includes two rectifying input terminals, a rectifying output terminal, and an electrically grounded rectifying ground terminal. The two rectifying input terminals are electrically coupled to the AC power source. The rectifying output terminal outputs the half-wave or full-wave driving AC power, and one terminal of the LED is electrically coupled to the rectifying output terminal. One terminal of the high-bias-voltage diode and one terminal of the balancing capacitor are electrically coupled to a balancing node, the other terminal of the high-bias-voltage diode is electrically coupled to the rectifying output terminal, and the other terminal of the balancing capacitor is electrically grounded. A forward bias direction of the high-bias-voltage diode is directed from the rectifying output terminal towards the balancing node. The driving chip receives an operating power from the balancing node and outputs a driving signal. The switch has a first terminal point being electrically grounded and a second terminal point. The switch receives the driving signal to be set to on or set to off. The other terminal of the LED is electrically coupled to the second terminal point to determine whether to drive the LED to emit light.

The balancing capacitor is discharged only to the driving chip through the arrangement of the forward bias direction of the high-bias-voltage diode, so that a capacitance value and a volume of the balancing capacitor are decreased, thereby reducing a space occupied by the LED driving circuit and a setup cost thereof.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
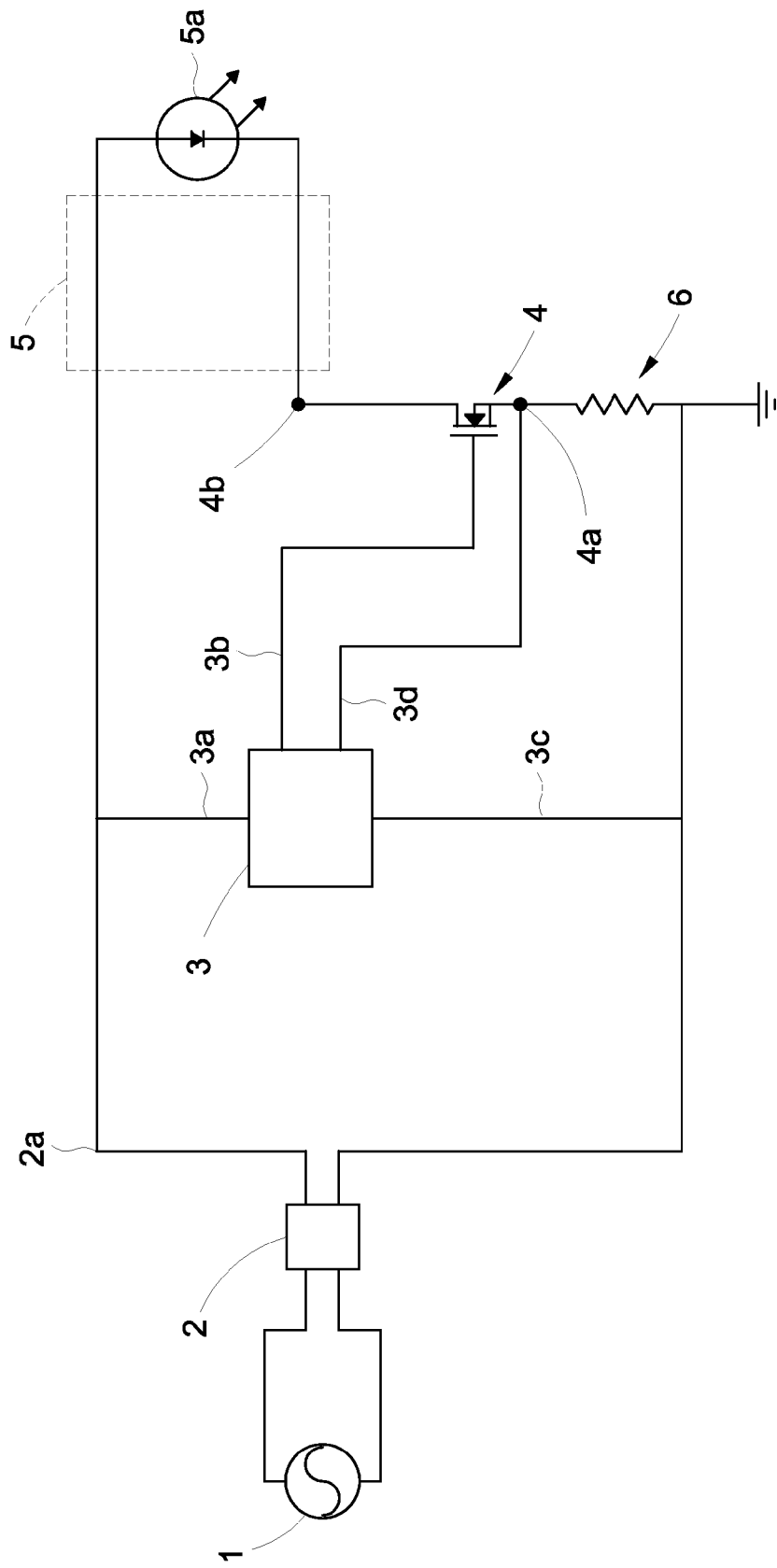
FIG. 1 is a block diagram of an LED driving circuit in the prior art.
Figure 2:
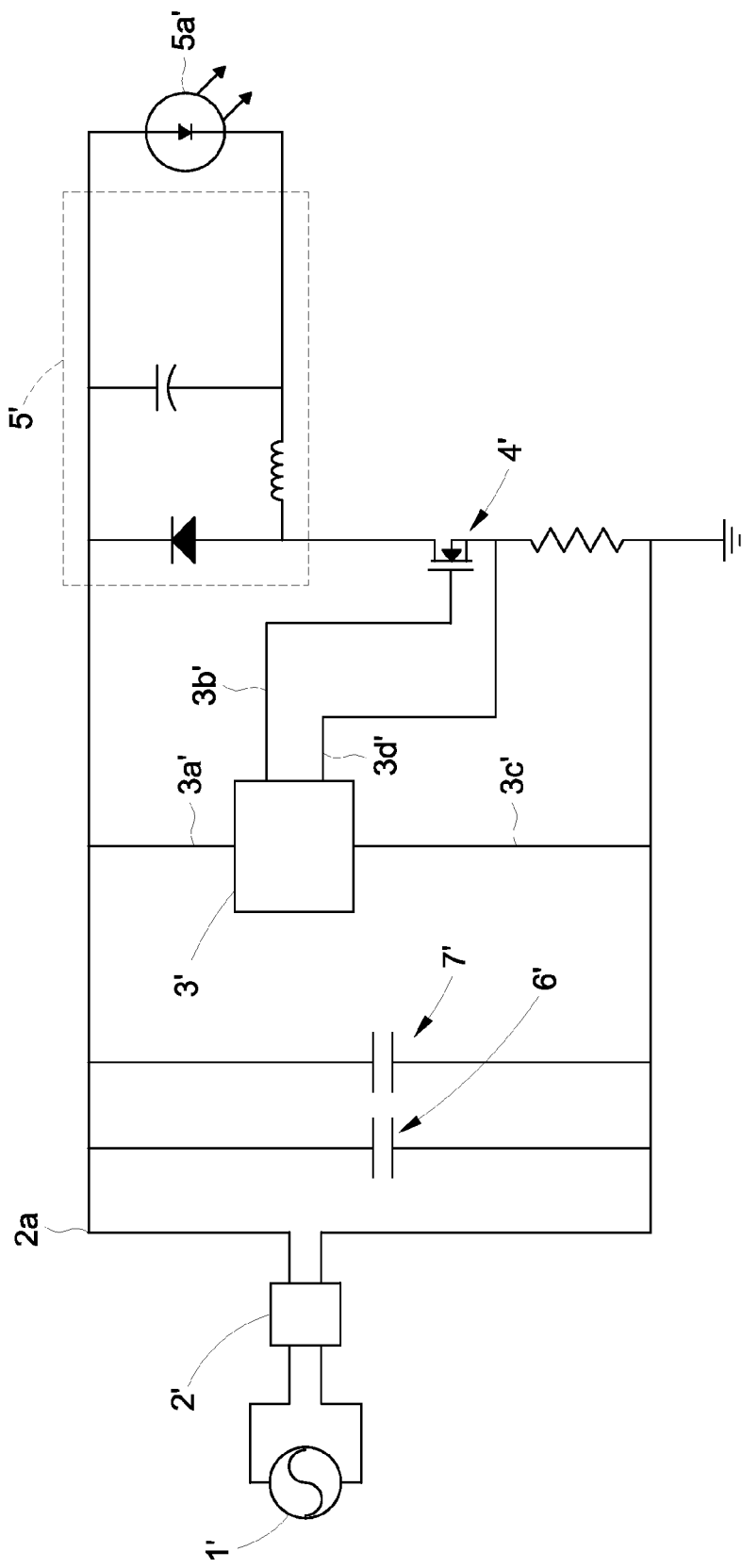
FIG. 2 is a block diagram of an LED driving circuit modified for a bridge rectifier in the prior art.
Figure 3:
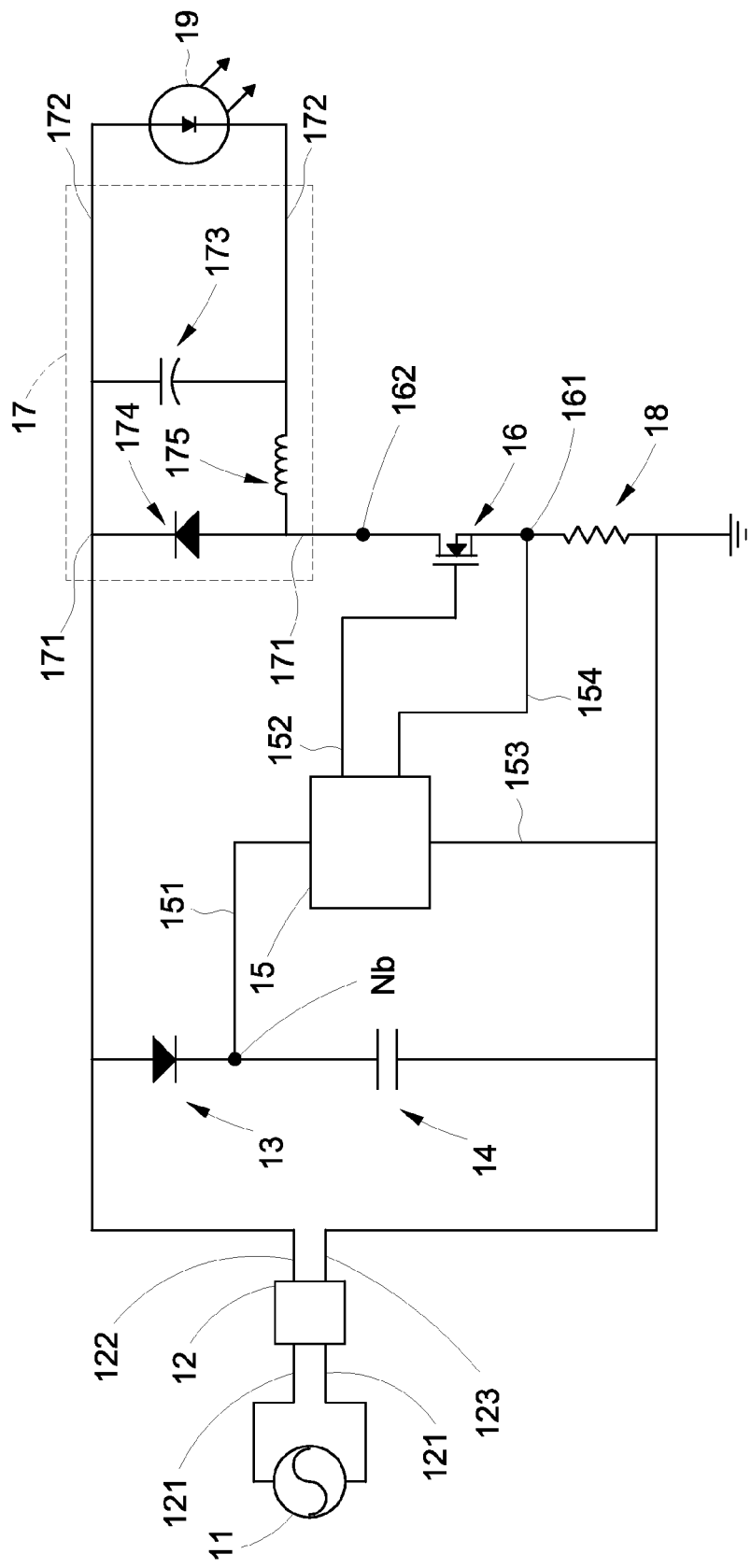
FIG. 3 is a block diagram of an embodiment of the present invention.
Figure 4:
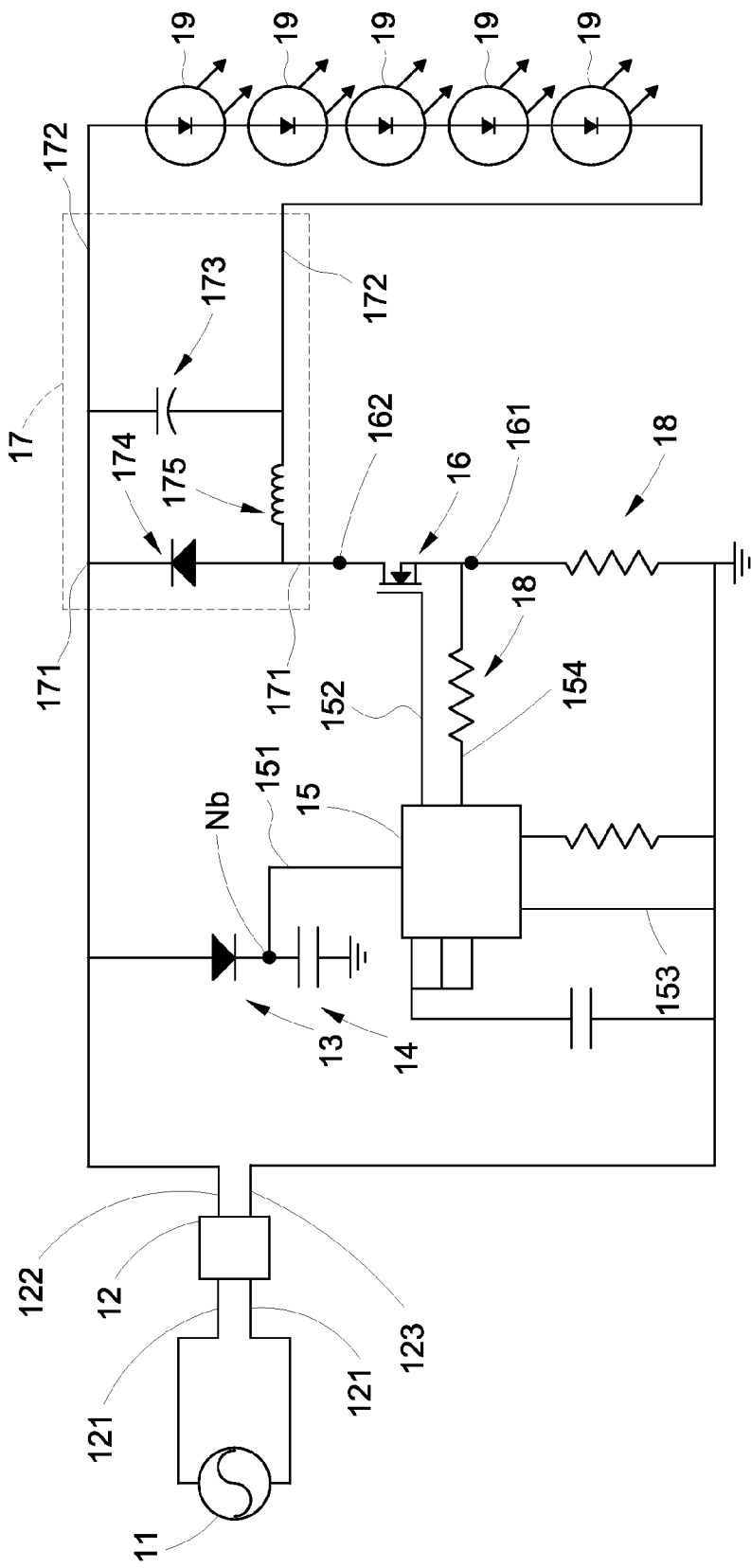
FIG. 4 is an implementation circuit in the embodiment of the present invention.

FIGS. 3 and 4 show a light emitting diode (LED) driving circuit provided in an embodiment of the present invention for receiving external AC power from an AC power source 11, converting the external AC, and providing a driving AC power to at least one LED 19. FIG. 3 is a block diagram, and FIG. 4 shows an implementation circuit.

Referring to FIGS. 3 and 4, the LED driving circuit includes an AC power source 11, a bridge rectifier 12, a high-bias-voltage diode 13, a balancing capacitor 14, a driving chip 15, a switch 16, and a load circuit 17.

The bridge rectifier 12 includes two rectifying input terminals 121, a rectifying output terminal 122, and a rectifying ground terminal 123. The two rectifying input terminals 121 are electrically coupled to the AC power source 11. The bridge rectifier 12 is used for receiving and rectifying external AC power and outputting a half-wave or full-wave driving AC through the rectifying output terminal 122. The rectifying ground terminal 123 is electrically grounded to provide a zero potential reference.

One terminal of the high-bias-voltage diode 13 and one terminal of the balancing capacitor 14 are electrically coupled to a balancing node Nb. The other terminal of the high-bias-voltage diode 13 is electrically coupled to the rectifying output terminal 122, and the other terminal of the balancing capacitor 14 is electrically grounded. A forward bias direction of the high-bias-voltage diode 13 is directed from the rectifying output terminal 122 towards the balancing node Nb.

The driving chip 15 at least includes a receive pin 151, a transmit pin 152, at least one ground pin 153, and a feedback pin 154. The receive pin 151 is electrically coupled to the balancing node Nb to receive an operating power to maintain the operation of the driving chip 15. The transmit pin 152 is electrically coupled to the switch 16 and outputs a driving signal to set the switch 16 to on or set the switch 16 to off. The ground pin 153 is indirectly or directly grounded to obtain a zero potential reference. The feedback pin 154 is used for monitoring an operation of the load circuit 17. A potential of the receive pin 15 must be higher than a threshold potential Vt so as to maintain a normal operation of the driving chip 15.

The switch 16 has a first terminal point 161 and a second terminal point 162. The first terminal point 161 is grounded through a voltage dropping resistor 18. The feedback pin 154 of the driving chip 15 is electrically coupled to the first terminal point 161 directly or through an adjusting resistor 18 to detect a potential of the first terminal point 161, so as to determine whether the switch 15 is set to on or set to off.

The load circuit 17 has two load input terminals 171 and two load output terminals 172. One of the two load input terminals 171 is electrically coupled to the rectifying output terminal 122 of the bridge rectifier, and the other load input terminal 171 is electrically coupled to the second terminal point 162 of the switch 16 so as to be grounded through the switch 16. The on or off of the switch 16 determines whether the rectifying output terminal 122 of the bridge rectifier 12 outputs a current to the load circuit 17. The two load output terminals 172 are electrically coupled to two terminals of the LED 19, so that the LED 19 is indirectly electrically coupled to the rectifying output terminal 122 of the bridge rectifier 12 and the second terminal point 162 of the switch 16 through the load output terminals 172. The on or off of the switch 16 determines whether one terminal of the LED 19 is electrically coupled to the rectifying output terminal 122 and the other terminal is electrically grounded through the switch 16, so that the LED 19 is driven by a current to emit light. The driving signal provided by the driving chip 15 is a PWM signal for turning on the switch 16, so that the load circuit 17 obtains the driving AC power from the rectifying output terminal 122 to drive the LED 19. Meanwhile, a magnitude of an average current received by the LED 19 may be changed by adjusting a pulse width and a pulse frequency, so as to change a brightness of the LED 19.

The load circuit 17 further includes an energy storage capacitor 173, a rectifier diode 174, and an energy storage inductor 175. The energy storage capacitor 173 and the rectifier diode 174 are connected to each other in parallel, and two terminals of the energy storage capacitor 173 and two terminals of the rectifier diode 174 are electrically coupled to the two load input terminals 171. A forward bias direction of the rectifier diode 174 is directed away from the switch 16. One terminal of the energy storage inductor 175 is electrically coupled to the load input terminal 171, and the other terminal is coupled to the energy storage capacitor 173. The energy storage capacitor 173 and the energy storage inductor 175 form an energy storage element to be connected to the rectifier diode 174 in parallel. When the switch 16 is set to on, the two load input terminals 171 receive the driving AC power, so that the rectifier diode 174 bears a reverse bias and no current will flow through the rectifier diode 174, and the energy storage capacitor 173 and the energy storage inductor 175 are charged. Meanwhile, the LED 19 receives the driving AC power from the load output terminals 172 and is driven to emit light. When the switch 16 is set to off, the energy storage capacitor 173 and the energy storage inductor 175 are discharged, so that the rectifier diode 174 bears a forward bias and current will flow through the rectifier diode 174 to form a circuit loop with the two load output terminals 172. In this manner, the LED receives from the load output terminals 172 the driving AC discharged by the energy storage capacitor 173 and the energy storage inductor 175 and is driven to emit light.

Figure 5A:
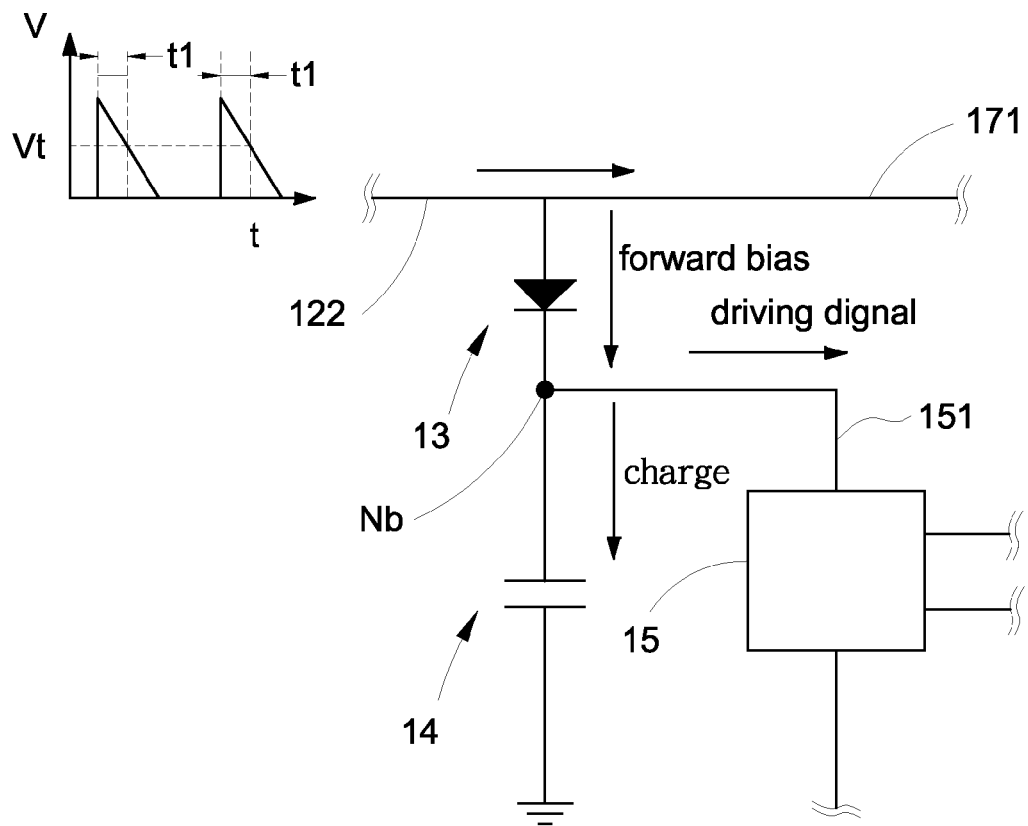
FIGS. 5A and 5B are block diagrams illustrating charging and discharging of a high-bias-voltage diode and a balancing capacitor.
Figure 5B:
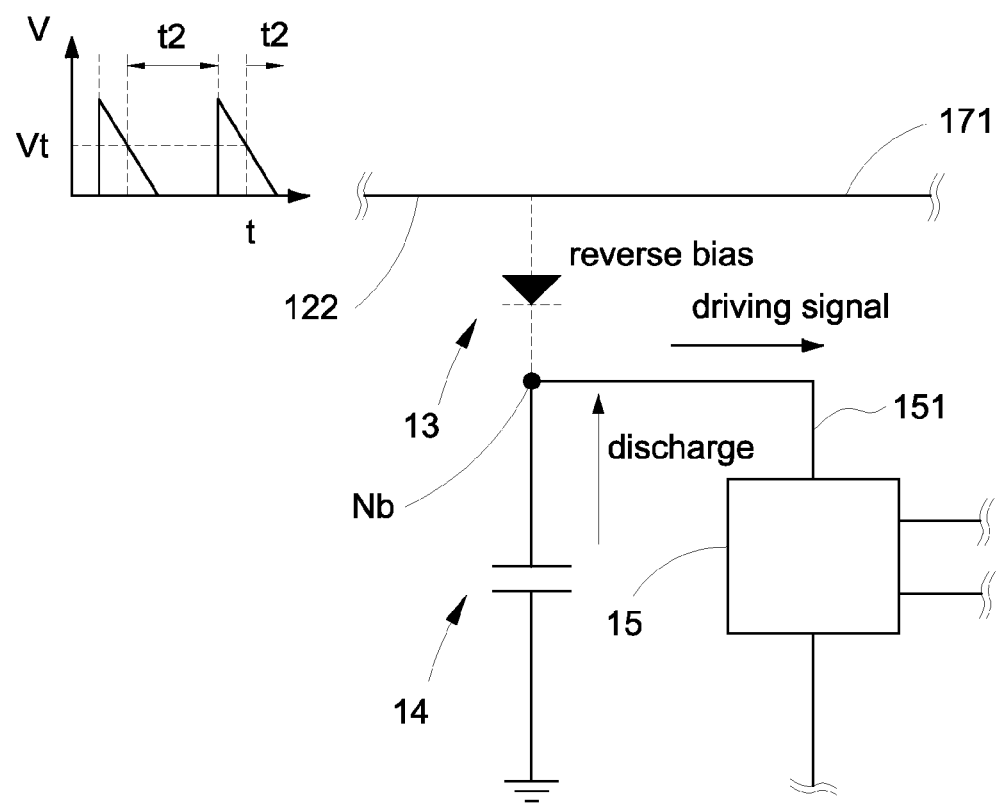
Figure 6:
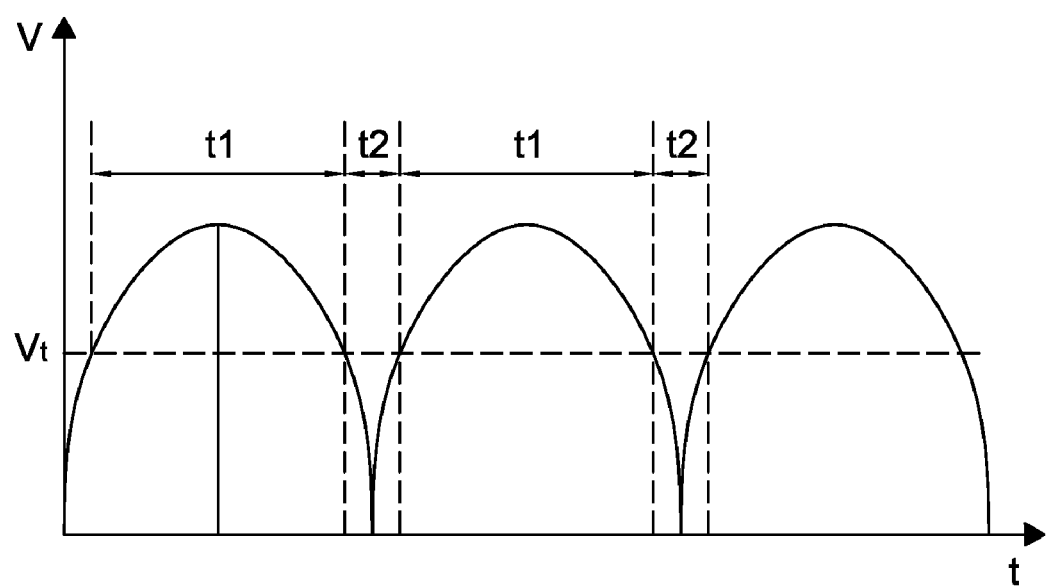
FIG. 6 is a waveform diagram of an output potential from a rectifying output terminal of a bridge rectifier.

FIGS. 5A and 5B are schematic views illustrating charging and discharging of the high-bias-voltage diode 13 and the balancing capacitor 14. FIG. 6 is a waveform diagram of an output potential from the rectifying output terminal 122 of the bridge rectifier 12. Referring to FIGS. 5A, 5B, and 6, in a time period t1, the bridge rectifier 12 outputs a half-wave driving AC power having a positive voltage, and in a time period t2, the output of the bridge rectifier 12 is zero.

Referring to FIGS. 5A and 6, in the time period t1, the bridge rectifier 12 outputs the half-wave driving AC power having a positive voltage. At this time, the high-bias-voltage diode 13 bears a forward bias, current will flow through the high-bias-voltage diode 13, and the current will charge the balancing capacitor 14 through the balancing node Nb. Meanwhile, the balancing capacitor 14 maintains a potential of the balancing node Nb above the threshold potential, so that the receive pin 151 of the driving chip 15 obtains a potential input through the balancing node Nb and performs a normal operation.

Referring to FIGS. 5B and 6, in the time period t2, the output of the bridge rectifier 12 is zero or lower than the threshold voltage Vt. At this time, a potential generated by the balancing capacitor 14 at the balancing node Nb causes the high-bias-voltage diode 13 to bear a reverse bias and no current will flow through the high-bias-voltage diode 13. As a result, the balancing capacitor 14 is not discharged to the outside, but only discharged to the driving chip 15. Thus, the balancing capacitor 14 only requires a relatively low capacitance value to maintain the potential of the balancing node Nb above the threshold potential Vt in the short time period t2, so as to maintain the normal operation of the driving chip 15.

When the output of the bridge rectifier 12 is zero or lower than the threshold potential Vt, the balancing capacitor 14 is only discharged to the driving chip 15. Thereby, the balancing capacitor 14 only requires a relatively low capacitance value, which reduces the volume and cost of the balancing capacitor 14. Meanwhile, the length of time at which the output of the rectifying device is zero, i.e., a length of the time period t2, may also be increased to improve the entire use efficiency of the electric energy.

What is claimed is:

1. A light emitting diode (LED) driving circuit, for receiving external AC power from an AC power source, converting the external AC power, and outputting a driving AC power to at least one LED, the LED driving circuit comprising:
    a bridge rectifier, for receiving said external AC power and outputting said driving AC power, and the bridge rectifier comprising:
        two rectifying input terminals, electrically coupled to the AC power source;
        a rectifying output terminal, for outputting the driving AC power, and one terminal of the LED being electrically coupled to the rectifying output terminal; and
        a rectifying ground terminal, for being electrically grounded;
    a high-bias-voltage diode, having one terminal electrically coupled to a balancing node and another terminal electrically coupled to the rectifying output terminal, and a forward bias direction of the high-bias-voltage diode being directed from the rectifying output terminal towards the balancing node;
    a balancing capacitor, having one terminal electrically coupled to the balancing node and another terminal being grounded;
    a driving chip, receiving operating power from the balancing node and outputting a driving signal; and
    a switch, having a first terminal point being electrically grounded and a second terminal point, receiving the driving signal to be set to on or set to off, and the other terminal of the LED being electrically coupled to the second terminal point.

2. The LED driving circuit as claimed in claim 1, wherein the driving chip at least comprises:
    a receive pin, electrically coupled to the balancing node to receive the operating power;
    a transmit pin, electrically coupled to the switch to output the driving signal for setting the switch; and
    at least one ground pin, grounded to obtain a zero potential reference.

3. The LED driving circuit as claimed in claim 1, wherein the first terminal point is electrically grounded through a voltage dropping resistor.

4. The LED driving circuit as claimed in claim 3, wherein the driving chip comprises a feedback pin electrically coupled to the first terminal point for detecting a potential of the first terminal point, so as to determine whether the switch is set to on or set to off.

5. The LED driving circuit as claimed in claim 4, wherein the feedback pin is electrically coupled to the first terminal point through an adjusting resistor.

6. The LED driving circuit as claimed in claim 1, further comprising a load circuit having:
    two load input terminals, one being electrically coupled to the rectifying output terminal and the other being electrically coupled to the second terminal point of the switch;
    two load output terminals, electrically coupled to the LED; and
    an energy storage capacitor and a rectifier diode, connected to each other in parallel, and two terminals of the energy storage capacitor and two terminals of the rectifier diode being electrically coupled to the two load input terminals, and a forward bias direction of the rectifier diode being directed away from the switch.

7. The LED driving circuit as claimed in claim 6, further comprising an energy storage inductor with one terminal electrically coupled to the load input terminal and the other electrically coupled to the energy storage capacitor.

8. The LED driving circuit as claimed in claim 1, wherein the driving AC power is a full-wave AC power or half-wave AC power.

* * * * *